(12) United States Patent
Drews et al.

(10) Patent No.: US 9,209,503 B2
(45) Date of Patent: Dec. 8, 2015

(54) METAL OXYGEN BATTERY CONTAINING OXYGEN STORAGE MATERIALS

(75) Inventors: Andrew Robert Drews, Ann Arbor, MI (US); Andrea Pulskamp, Plymouth, MI (US); Jun Yang, Ann Arbor, MI (US); Shinichi Hirano, West Bloomfield, MI (US); Michael Alan Tamor, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 12/828,396

(22) Filed: Jul. 1, 2010

(65) Prior Publication Data

US 2011/0165475 A1    Jul. 7, 2011

(51) Int. Cl.
*H01M 12/06* (2006.01)
*H01M 12/08* (2006.01)

(52) U.S. Cl.
CPC .............. *H01M 12/06* (2013.01); *H01M 12/08* (2013.01)

(58) Field of Classification Search
CPC  H01M 12/06; H01M 12/065; H01M 8/04059
USPC .................................. 429/403, 402, 405, 407
See application file for complete search history.

(56) References Cited

U.S. PATENT DOCUMENTS

| | | | |
|---|---|---|---|
| 4,105,830 A * | 8/1978 | Kordesch | 429/405 |
| 4,369,235 A | 1/1983 | Bursell | |
| 4,482,618 A | 11/1984 | Orsino et al. | |
| 4,762,978 A | 8/1988 | Tanis | |
| 6,238,821 B1 | 5/2001 | Mukherjee et al. | |
| 6,280,871 B1 | 8/2001 | Tosco et al. | |
| 6,372,370 B1 | 4/2002 | Kaplan et al. | |
| 6,599,655 B2 | 7/2003 | Johnson et al. | |
| 7,070,882 B1 | 7/2006 | Ferrando | |

(Continued)

FOREIGN PATENT DOCUMENTS

| | | | |
|---|---|---|---|
| JP | 2006221993 A | 8/2006 | |
| JP | 2009-230985 | * 10/2009 | ............ H01M 12/06 |

(Continued)

OTHER PUBLICATIONS

C. Combelles et al., Structural, Magnetic and Redox Properties of a New Cathode Material for Li-ion Batteries; The Iron-based Metal Organic Framework, Ionics, Abstract, vol. 14, No. 4, Jul. 2008, pp. 279-283.

(Continued)

*Primary Examiner* — Barbara Gilliam
*Assistant Examiner* — Angela Martin
(74) *Attorney, Agent, or Firm* — Damian Porcari; Brooks Kushman P.C.

(57) ABSTRACT

In one embodiment, a metal oxygen battery is provided. The metal oxygen battery includes a battery housing including a first compartment and a second compartment. The first compartment includes a first electrode and an oxygen storage material in communication with the first electrode. The second compartment includes a second electrode and the second electrode includes a metal material (M). In another embodiment, the oxygen storage material is configured as a number of particles disposed within the first electrode. In certain instances, at least a portion of the number of particles are each contained within a selective transport member. In certain other instances, the selective transport member is oxygen permeable and electrolyte impermeable.

22 Claims, 3 Drawing Sheets

(56) References Cited

U.S. PATENT DOCUMENTS

| | | |
|---|---|---|
| 7,147,967 B1 | 12/2006 | Read |
| 7,198,867 B2 * | 4/2007 | Sanders .................. 429/218.2 |
| 7,309,380 B2 | 12/2007 | Muller et al. |
| 7,481,866 B2 | 1/2009 | MacGillivray et al. |
| 7,517,396 B2 | 4/2009 | Arnold et al. |
| 7,553,352 B2 | 6/2009 | Mueller et al. |
| 7,652,132 B2 | 1/2010 | Yaghi et al. |
| 2003/0075643 A1 | 4/2003 | Dunn |
| 2003/0099884 A1 | 5/2003 | Chiang et al. |
| 2003/0170516 A1 | 9/2003 | Prerad |
| 2004/0225134 A1 | 11/2004 | Yaghi et al. |
| 2005/0287421 A1 | 12/2005 | Simon et al. |
| 2006/0127764 A1 | 6/2006 | Chen et al. |
| 2006/0292434 A1 | 12/2006 | Hampden-Smith et al. |
| 2007/0141431 A1 * | 6/2007 | Wang et al. .................. 429/34 |
| 2007/0172739 A1 | 7/2007 | Visco et al. |
| 2008/0299456 A1 | 12/2008 | Shiga et al. |
| 2009/0123811 A1 * | 5/2009 | Baumann et al. ............... 429/34 |
| 2009/0239132 A1 | 9/2009 | Johnson |
| 2009/0261107 A1 | 10/2009 | Allegeier et al. |
| 2010/0151336 A1 | 6/2010 | Nakanishi |
| 2010/0186588 A1 | 7/2010 | Yaghi et al. |
| 2011/0104576 A1 | 5/2011 | Johnson et al. |

FOREIGN PATENT DOCUMENTS

| | | |
|---|---|---|
| JP | 2009230985 A | 10/2009 |
| WO | 99/60654 | 11/1999 |
| WO | 2007074098 | 5/2007 |
| WO | 2008136296 | 11/2008 |

OTHER PUBLICATIONS

M. Mirzaeian et al., Preparation of Controlled Porosity Carbon Aerogels for Energy Storage in Rechargeable Lithium Oxygen Batteries, Electrochimica Acta 54, (2009), pp. 7444-7451.

* cited by examiner

METAL OXYGEN BATTERY CONTAINING OXYGEN STORAGE MATERIALS

BACKGROUND

1. Technical Field

One or more embodiments of the present invention relate to oxygen storage materials as a source of oxygen for metal oxygen batteries and their method of use.

2. Background Art

There are many power storage and generation devices for vehicles. For instance, a fuel cell is a thermodynamically open system in which a fuel, such as hydrogen, irreversibly reacts with an oxidant, such as oxygen, to form water and electrical energy. By contrast, a battery is an electrochemical device that is often formed of a number of separate electrochemical battery cells interconnected to a single set of terminals providing an electrical output.

SUMMARY

According to one aspect of the present invention, a metal oxygen battery is provided. In one embodiment, the metal oxygen battery includes a battery housing including a first compartment and a second compartment, the first compartment including a first electrode and an oxygen storage material in communication with the first electrode, the second compartment including a second electrode, the second electrode including a metal material (M). In certain instances, the first electrode is a cathode and the second electrode is an anode.

In another embodiment, the cathode compartment further includes a selective transport member to separate the oxygen storage material from the cathode. In certain instances, the selective transport member is oxygen permeable. In certain other instances, the selective transport member is electrolyte impermeable. In certain other instances, the selective transport member is no greater than 10 percent by volume relative to the oxygen storage material. In certain other instances, the selective transport member is no greater than 10 percent by weight relative to the oxygen storage material.

In yet another embodiment, the oxygen storage material is configured as a number of particles disposed within the first electrode. In certain instances, at least a portion of the number of particles are each contained within a selective transport member. In certain other instances, the selective transport member is oxygen permeable. In certain other instances, the selective transport member is electrolyte impermeable. In certain other instances, a total volume of the selective transport member is no greater than 10 percent by volume relative to a total volume of the oxygen storage material. In certain other instances, a total weight of the selective transport member is no greater than 10 percent by weight relative to a total weight of the oxygen storage material. In certain other instances, the number of particles have an average particle size of 1 to 500 micrometers.

In yet another embodiment, the cathode compartment further includes an electrolyte component. In certain instances, the electrolyte component is a liquid electrolyte, a non-aqueous liquid electrolyte, a polymer gel, an ionic liquid electrolyte, a solid inorganic electrolyte, a solid polymer electrolyte, or a combination thereof.

In yet another embodiment, the first compartment further includes a catalytic component.

In yet another embodiment, the first compartment further includes an ionically conductive component.

According to another aspect of the present invention, a method of using a metal oxygen battery is provided. In one embodiment, the method includes providing a metal oxygen battery including a first compartment including a first electrode and a second compartment including a second electrode, the metal oxygen battery further including an oxygen storage material disposed within the first compartment; and providing a fluid communication between the first electrode and the oxygen storage material.

DETAILED DESCRIPTION

Reference will now be made in detail to embodiments of compositions, structures, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

There are many power storage and generation devices for vehicles. For instance, a fuel cell is a thermodynamically open system in which a fuel, such as hydrogen, irreversibly reacts with an oxidant, such as oxygen, to form water and electrical energy. By contrast, a battery is an electrochemical device that is often formed of a number of separate electrochemical battery cells interconnected to a single set of terminals providing an electrical output.

Electrochemical battery cells can include numerous configurations and chemistries, including primary or non-rechargeable battery cells and secondary or rechargeable battery cells. Non-limiting examples of a secondary battery cell include a lithium ion cell, a metal hydride cell, a metal-air battery cell, and a metal-oxygen battery cell. In general, a secondary battery cell is capable of storing electrical energy chemically, and the chemical storage often involves a reversible redox reaction. In the uncharged state, the redox reaction does not start spontaneously, and, in such cases, the secondary battery cell needs to be charged initially in order to store energy.

In one example of a secondary battery cell, a lithium ion cell includes a layered oxide positive electrode including lithium in ionic communication with a graphite negative electrode through a non-aqueous electrolyte and a separator. During charging, lithium is ionized from the layered oxide positive electrode and migrates through the electrolyte and separator to the negative electrode and becomes embedded in the porous negative electrode composition by the process of intercalation. During a discharge half step, the intercalation composition decomposes allowing current to flow within the battery cell by the movement of lithium ions from the negative electrode to the positive electrode.

In another example of a secondary battery cell, the metal hydride battery cell includes a metal oxyhydroxide positive electrode, such as a nickel oxyhydroxide, electrically communicating with a metal alloy negative electrode. The metal alloy negative electrode is a hydrogen storage alloy negative electrode. The hydrogen storage alloy includes a material reversibly forming a mixture of metal hydride compounds. In certain instances, the hydrogen storage alloy includes an intermetallic material having two or more solid phase metallic elements.

In yet another example of a secondary battery cell, a metal air battery cell is, in typical configurations, an open system with respect to material flow, heat transfer, and work. For instance, a metal air battery cell is provided with holes, openings, or vents, which mediate air transport between the metal air battery and atmospheric air. For most metal air batteries, moisture and interfering gases from the air often need to be filtered, eliminated, or trapped prior to the air's being introduced to the metal air battery. For instance, the metal air battery cell includes an air positive electrode electrically communicating with a metal negative electrode through an electrolyte and a separator. The air positive electrode, in typical configurations, includes a carbon composition positive electrode. During the charge reaction, oxygen is released to the ambient air.

Metal oxygen batteries (MOBs) are conventionally characterized as a subgroup of the metal air batteries as oxygen is commonly involved for the electrochemical reactions. MOBs are known to have relatively high electrochemical capacities, and are therefore of great interest for applications where the total mass of a given battery is limited. Implementation of conventional MOBs has been met with difficulties in that their performance, both in terms of capacity and power, has been largely unsatisfactory. The limited performance is believed to be at least in part associated with incomplete or slow reactions involving the arrival and diffusion of oxygen molecules. For an MOB to achieve its full discharge capacity, sufficient quantities of oxygen must be made available in a timely manner. In addition, since the rate of discharging is tied to the formation and growth of the positive electrode oxide, the battery's rate of discharging at least in part depends on the more rate limiting processes of oxygen diffusion.

In one or more embodiments, the term metal oxygen battery (MOB) refers to a battery structure that differs from conventional metal oxygen/air batteries at least in that the MOB is relatively closed to atmospheric air and oxygen for reactions is relatively devoid of unwanted species such as nitrogen or carbon dioxide.

In one or more embodiments, the term "electrode" may refer to a structure through which charges are carried by electromotive force. Electrodes may be composed of one or more metal and/or semiconductor. Electrodes may be solid or liquid.

In one or more embodiments, the term "electrolyte" refers to a material and/or structure through which charges are carried by the movement of ions. Electrolytes may be any phase on the continuum of liquid to solid, including polymer gels, pastes, fused salts, organic carbonates, or ionically conducting solids, such as sodium β-alumina, which has mobile sodium ions.

In one or more embodiments, metal-oxygen batteries (MOBs) may refer to a class of electrochemical cells in which, during discharging, oxygen is reduced at a positive electrode surface as part of the electrochemical cell reaction. Reduction of the oxygen forms an oxide or peroxide ion which reacts with a cationic metal species. Metal-oxygen batteries may be based upon Fe, Zn, Al, Mg, Ca, and Li.

MOBs, such as $Li^+$ based MOBs, have recently been demonstrated experimentally in a small number of laboratories. However, implementation of conventional MOBs has been largely unsuccessful because their performance, both in terms of capacity and power, has been unsatisfactory for vehicle applications. The limited performance is believed to be likely associated with incomplete or slow reactions involving the arrival and dissociation of oxygen molecules from the atmospheric air. In particular, for a metal oxygen battery to achieve its full discharge capacity, sufficient quantities of oxygen should be made available in a timely manner. In addition, since the rate of discharge is tied to the formation and growth of the cathode oxide, the battery's rate of discharge depends in part on the more rate limiting processes of oxygen dissociation.

It has been found, according to one or more embodiments of the present invention, that the MOB performance can be greatly improved by one or more of the following approaches: (1) providing a relatively high concentration of oxygen at the positive electrode; and/or (2) increasing oxygen diffusion rate at the positive electrode.

One or more of the following benefits can be realized according to certain embodiments of the present invention: (1) requirements for many balance of plant (BOP) components including positive electrode flow field, blower, and air purification system, can be reduced or eliminated; (2) susceptibility to contamination from atmospheric air impurities can be reduced or eliminated; (3) battery system flexibility may be increased and packaging costs can be reduced; (4) battery cell manufacturing procedures may be simplified; and/or (5) improved battery performance kinetics may be realized via a reduction in bulk diffusion and an increase in surface diffusion.

Figure 1:
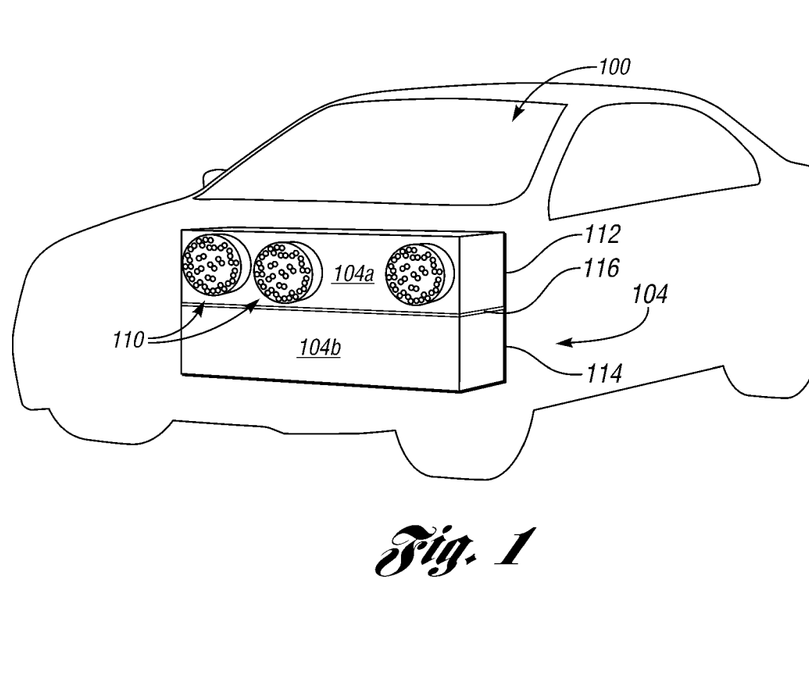
FIG. 1 depicts an illustrative view of a battery system for use in a vehicle according to one embodiment of the present invention.

According to one aspect of the present invention, a battery system is provided. In one embodiment, and as depicted in FIG. 1, a battery system generally shown at 100 includes a metal oxygen battery 104 having a first electrode 104a and a second electrode 104b, the second electrode 104b including a metal material M (not shown). An oxygen storage material 110 is disposed within the metal oxygen battery 104. In certain instances, the metal oxygen battery 104 further includes a separator 116 defining a first electrode compartment 112 including the first electrode 104a and a second electrode compartment 114 including the second electrode 104b. In this configuration, the oxygen storage material 110 is disposed within the first electrode compartment 112 and communicates oxygen 108 to and from the first electrode 104a.

In certain instances, the oxygen storage material 110 is in fluid communication with the metal oxygen battery 104, and in certain particular instances the fluid is oxygen.

In one or more embodiments, the metal material M includes one or more elemental metal listed in the periodic table and/or one or more alloys formed of a mixture of two or more of the elemental metals. A non-limiting list of the elemental metals includes alkali metals, alkaline earth metals, transition metals and post-transition metals.

Figure 2:
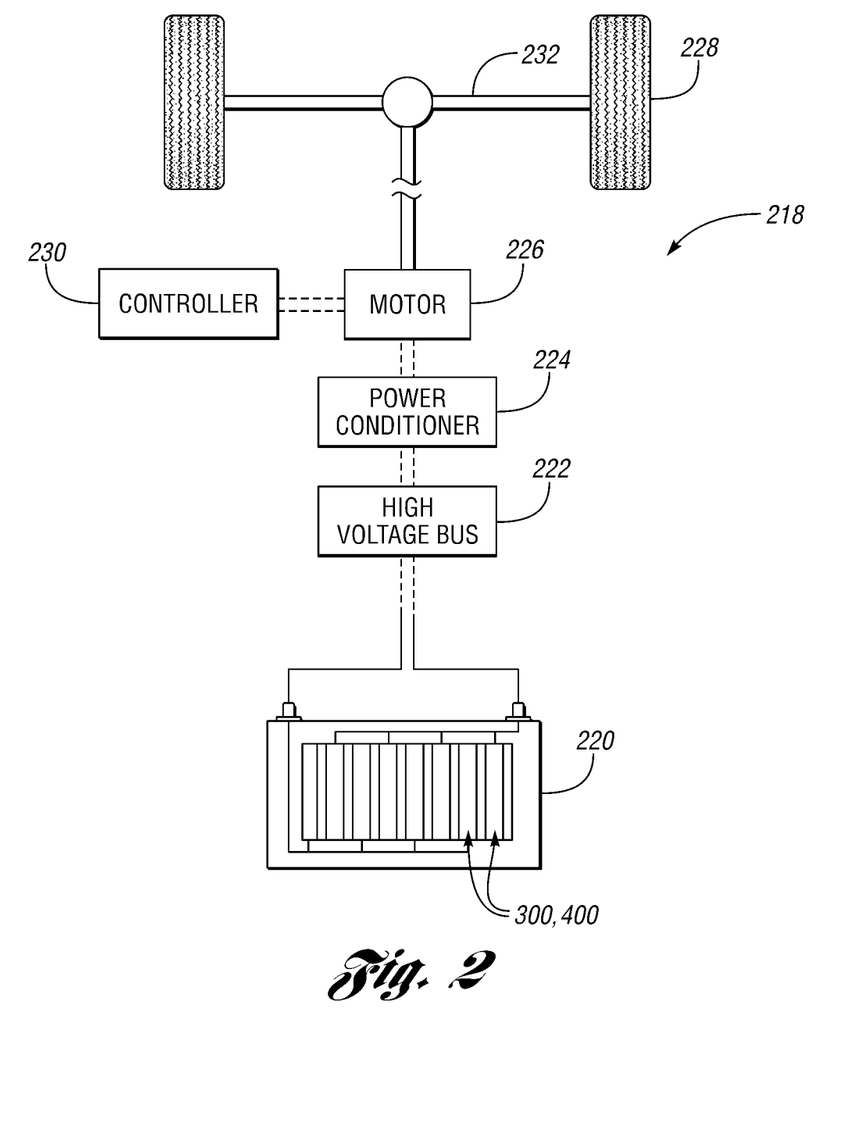
FIG. 2 illustrates a top view of an electric vehicle including a metal oxygen battery or a metal oxygen battery system according to another embodiment of the present invention.

FIG. 2 illustrates a top view of an electric vehicle including a metal oxygen battery or a metal oxygen battery system according to another embodiment of the present invention. As illustratively depicted in FIG. 2, connected to vehicle 218 is a metal oxygen battery (MOB) system 220 electrically communicating directly or indirectly with a controller 230. In certain instances, the MOB system 220 includes one or more MOBs 300 referenced in FIG. 3 and/or one or more MOBs 400 referenced in FIG. 4A. The controller 130 electrically communicates with a traction motor 226. Traction motor 226 is connected to at least one wheel 228 of the vehicle 218. In certain instances, MOB battery system 220 electrically communicates with and provides energy to a high-voltage bus 222. High-voltage bus 222 electrically communicates with and provides energy to a power conditioner 224. The power conditioner 224 electrically communicates with the traction motor 226 which is connected directly or indirectly to wheel 228 situated on a frame 232.

Figures 3, 4A, 4B:
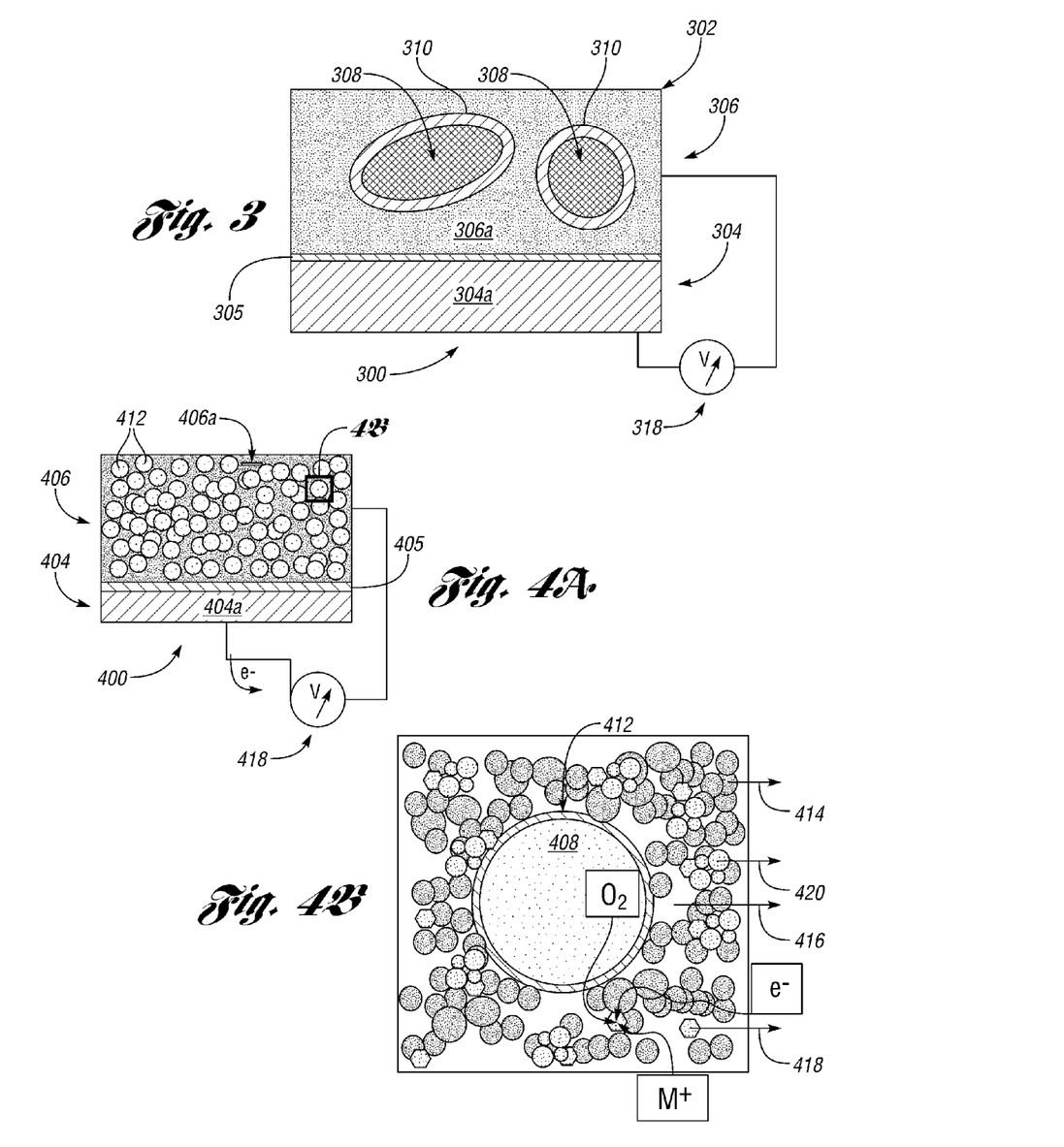
FIG. 3 depicts a metal oxygen battery according to another embodiment of the present invention.
FIG. 4A depicts a metal oxygen battery according to yet another embodiment of the present invention.
FIG. 4B depicts an enlarged partial view of the metal oxygen battery of FIG. 4A.

In one embodiment, and as depicted in FIG. 3, a metal oxygen battery generally shown at 300 includes a battery housing 302 including a first compartment 306 including a first electrode 306a in ionic communication via a separator 305 with a second electrode 304a and a second compartment 304 including a second electrode 304a, the second electrode 304a including a metal material (M) (not shown); and an oxygen storage material 308 disposed within the first compartment 306 and being in communication with the first electrode 306a. An electric circuit 318 completes the electric energy generation loop by connecting the first and second electrodes 306a, 304a.

In certain instances such as during discharging, the first electrode 306a functions as a positive electrode or a cathode, and the second electrode 304a functions as a negative electrode or an anode. In certain other instances such as during charging, the first electrode 306a may function as a negative electrode or an anode, and the second electrode 304a may function as a positive electrode or a cathode. In these instances, the term "positive electrode" refers to an electrode with a positive polarity, and the term "negative electrode" refers to an electrode with a negative polarity.

In yet another embodiment, and as depicted in FIG. 3, the first compartment 306 further includes a selective transport member 310 separating the oxygen storage material 308 from the first electrode 306a. Without being limited to any particular theory, it is appreciated that the selective transport member 310 helps prevent the oxygen storage material 308 from being contaminated by components disposed nearby in the first compartment 306. These components may include electrolyte materials, conductive materials, and catalytic materials. Reducing the contamination of the oxygen storage material 308 by these materials is beneficial for maintaining the structural and chemical integrity of the oxygen storage material 308 for the purpose of storing oxygen and facilitating transport of oxygen.

In one or more embodiments, and as depicted in FIG. 3, the selective transport member 310 separates the oxygen storage material 308 from the first electrode 306a in a way such that the oxygen storage material 308 is configured as one or more lobes disposed within the first compartment 306. The oxygen storage material 308 may be contained within the selective transport member 310 in any suitable degrees of containment. For instance, the oxygen storage material 308 may be fully enclosed within the selective transport member 310, which in this arrangement is effectively an outer layer or an outer coating. The oxygen storage material 308 may also be partially contained within the selective transport member 310. In this arrangement, a percent portion of the outer surface of the oxygen storage material 308 is in a range of 35 percent to 95 percent, 45 percent to 95 percent, or 55 percent to 95 percent.

In yet another embodiment, a metal oxygen battery generally shown at 400 in FIG. 4A includes a first compartment 406 including a first electrode 406a, second compartment 404 including a second electrode 404a, and optionally a separator 405 separating the first and second electrode 406a, 404a. An electric circuit 418 completes the electric energy generation loop by connecting the first and second electrodes 406a, 404a. FIG. 4B depicts an enlarged partial view of the metal oxygen battery 400 of FIG. 4A, at least during a state of partial discharge. Without being limited to any particular theory, a state of partial discharge refers to an operating state of the first electrode 406a wherein the OSM has remaining extractable oxygen available for reaction. In certain instances, a state of partial discharge refers to an operating state in between a fully discharged state when all the anode metal is oxidized and a fully charged state when the cathode is cleared of all the metal oxides or metal peroxides.

As depicted in FIGS. 4A and 4B, an oxygen storage material 408 is configured as a number of particles 412 disposed within the first compartment 406. In this arrangement, the oxygen storage material 408 is configured to be distributed with a relatively greater surface area for facilitating transport of oxygen. Moreover, and in the instances where other components such as ionic conductive components 414, electrolytic components 416, catalytic components 418, and oxide products 420 of M are included in the first compartment 406, material flow and chemical interactions between these components and the oxygen storage material 408 can be greatly improved by virtue of the oxygen storage material 408 being configured as a number of particles 412. In certain instances, at least a portion of the number of particles 412 is in contact with a selective transport member 410, or particularly is each contained within the selective transport member 410.

In certain other instances, the particles 412 have an average particle size of 1 to 500 micrometers, 10 to 400 micrometers, or 25 to 300 micrometers.

In yet another embodiment, and as depicted in FIG. 4B, the first compartment 406 further includes an electrolytic component 416. In certain instances, the electrolytic component is a liquid electrolyte, a non-aqueous liquid electrolyte, a polymer gel, an ionic liquid, a solid inorganic electrolyte, a solid polymer electrolyte, or a combination thereof.

In one or more embodiments, the selective transport member 310, 410 helps provide oxygen communication between the first electrode 306, 406 and the oxygen storage material 308, 408, while relatively limiting the amount of communication of other substances such as electrolytes or carbon particle, if present. However, the total volume and/or the total weight of the selective transport member 310, 410 may be provided to avoid unnecessary bulk to an overall design of the metal oxygen battery 300, 400.

In one more embodiments, the selective transport member 310, 410 is oxygen permeable. Without being limited to any particular theory, it is believed that oxygen permeability may be a function of many variables. The variables may include thickness of the selective transport member 310, 410, radius of the OSM particles or spheres, system operating pressure and temperature, system energy output requirement. In certain instances, at least 85 percent, 90 percent, or 95 percent by weight of the surrounding oxygen species can freely enter into and exit from the selective transport member 310, 410 without resistance.

In certain other instances, the selective transport member 310, 410 is electrolyte impermeable. Without being limited to any particular theory, it is believed that electrolyte impermeability may be a function of many variables. The variables may include thickness of the selective transport member 310, 410, radius of the OSM particles or spheres, system operating pressure and temperature, system energy output requirement. In certain instances, at least 85 percent, 90 percent, or 95 percent by weight of the surrounding electrolyte molecules and species are blocked from entering into the selective transport member 310, 410. In certain particular instances, the OSM particles as defined by the selective transport member 310, 410 are completely devoid of any electrolyte molecules or species thereof and any presence of the latter would be incidental.

In certain other instances, the selective transport member 310, 410 in its collective volume is no greater than 10 percent by volume relative to the oxygen storage material 308, 408. The collective volume of the selective transport member 310, 410 is minimized with respect to other components. In certain instances, the selective transport member 310, 410 in its collective volume is 1 percent to 10 percent, 2 percent to 8 percent, or 4 percent to 5 percent by volume relative to the oxygen storage material 308, 408.

In certain other instances, the selective transport member 310, 410 is no greater than 10 percent by weight relative to the oxygen storage material 308, 408. The collective volume of the selective transport member 310, 410 is preferably controlled to avoid over-powering other components of the battery system and to effectively utilize the battery interior space. In certain instances, the selective transport member 310, 410 in its collective weight is 1 percent to 10 percent, 2 percent to 8 percent, or 4 percent to 5 percent by weight relative to the oxygen storage material 308, 408.

In yet another embodiment, the MOB 104 further includes a catalytic component. Non-limiting examples of the catalytic component include metal oxides such as $CO_3O_4$, $Fe_2O_3$; precious metals such as Pt; metal nitrides; metal silicides; and metal organics.

In yet another embodiment, the MOB 104 further includes an ionically conductive component. Non-limiting examples of the ionically conductive component include graphite, carbon black, hard carbons, metal oxides, amorphous carbon, nanotubes, graphene polymers such as polyacrylonitrile, polyethylene oxide liquids such as propylene carbonate, ethylene carbonate, dimethyl carbonate, diethyl carbonate, and inorganics such as lithium phosphorous oxynitride under the name of LIPON.

In yet another embodiment, the MOB 104 further includes an ionically conductive component. Non-limiting examples of the ionically conductive component include lithium silicon under the name of LISICON and oxynitride.

In one or more embodiments, the term "substantially free" refers to an extent of being less than 1000 parts per million (ppm), less than 500 ppm, less than 200 ppm, less than 100 ppm, or less than 50 ppm. In some instances means that a substance, such as water, is not purposefully added and whose presence, if any, is only incidental.

In yet another embodiment, the oxygen containment unit 102 includes relatively pure oxygen species in that any other gas or fluid species, such as nitrogen ($N_2$), is not present or only incidentally present at a nominal amount. This is in direct contrast to atmospheric air wherein nitrogen has a relatively significant presence relative to oxygen. In certain instances, when incidentally present, nitrogen is less than 1000 ppm, less than 500 ppm, less than 100 ppm, or less than 50 ppm.

As stated herein, one of the advantages of the present invention, in one or more embodiments, is that oxygen can be stored in the oxygen storage material 110 with a relatively high concentration and/or density as unusable or interfering gas molecules such as nitrogen can be effectively avoided. As a result, an oxygen material flow communicating between the MOB 104 and the OSM 110 can be effectively in a relatively how flow rate, which further reduces system costs associated with effecting and maintaining otherwise relatively high flow rate operations.

According to another aspect of the present invention, a method is provided for operating a metal oxygen battery as described herein. In one embodiment, the method includes providing a metal oxygen battery including a cathode compartment including a cathode and an anode compartment including an anode, the metal oxygen battery further including an oxygen storage material disposed within the cathode compartment; and providing a fluid communication between the cathode and the oxygen storage material.

In one or more embodiments, the metal-oxygen battery cell is a closed-loop system with respect to material flow, but not to heat transfer or work. For instance, the metal-oxygen battery cell includes an oxygen positive electrode ionically communicating with a metal negative electrode through an electrolyte and a separator. The oxygen positive electrode includes an oxygen storage material which stores oxygen by the process of physiosorption, including adsorption, intercalation and clathratization processes. It should be appreciated that the oxygen positive electrode may further include a structural component in addition to the oxygen storage material, such as a carbon material. It is appreciated that the metal-oxygen battery positive electrode may further include a catalytic component, such as $Fe_2O_3$ and/or $CO_3O_4$; an ion conductive component, such as polyacrylonitrile and/or polyethylene oxide; and/or an electron conductive component including a conductive aid, such as amorphous carbon, graphitic carbon, graphene, and/or carbon nanotubes.

In one or more embodiments, the metal-oxygen battery cell undergoes reversible redox reactions. During the discharging reaction, the oxygen reacts with a metal cation from the metal negative electrode, forming a metal oxide and/or a metal peroxide which is then situated at the positive electrode. During the charging reaction, the metal oxide decomposes, releasing oxygen which, in at least one embodiment, is stored in a metal oxygen framework (MOF) composition at the positive electrode. The metal cation migrates back to the negative electrode reacquiring an electron from the negative electrode and forming a metal composition.

Oxygen storage materials (OSMs) may be utilized for oxygen by providing appreciable surface area for enhancing oxygen uptake. Desirable on-board operating conditions illustratively include near ambient temperature (T) (e.g., 150 K to 400 K) and modest pressure (P) (e.g., 1 to 100 bar) to avoid added cost or system complexity. Particularly suitable binding energies for oxygen material storage may be determined based on the Clausius-Claeypron Equation of the form:

$$\ln P = \frac{-\Delta H}{R} \frac{1}{T}$$

where P is the partial pressure of oxygen, ΔH is the sorbent oxygen binding energy, R is a constant, and T is the temperature in degrees Kelvin of the oxygen. In certain other instances, the OSM has an oxygen binding energy, or particularly an isosteric adsorption enthalpy, ranging from 5 kJ/mol.$O_2$ to 100 kJ/mol.$O_2$, or 7 kJ/mol.$O_2$ to 70 kJ/mol.$O_2$, or to 10 kJ/mol.$O_2$ to 40 kJ/mol.$O_2$.

In one or more embodiments, OSMs may be utilized for storage oxygen at relatively high density. The volumetric storage capacity of an OSM may be related to the gravimetric capacity and material density for the OSM. As a non-limiting example, if a given OSM has a gravimetric capacity of 0.3 kg of oxygen per kg and a materials density of 0.2 g/mL, a corresponding volumetric capacity would be 60 g of oxygen per liter of OSM. Storing 8 kg of oxygen would use 133 liters of OSM. However, if the material density is 1 g/mL, only 27 liters of OSM would be required.

Without being limited to any particular theory, it is appreciated that the OSMs are generally provided with a relatively high-surface area, which facilitates oxygen uptake or adsorption by processes such as physiosorption. Such oxygen uptake scales linearly with surface area as measured using any suitable method such as the BET method. In certain instances, the surface area of the OSM exceeds 1000 $m^2$/g, from 2000 $m^2$/g to 8000 $m^2$/g, or from 3000 $m^2$/g to 6000 $m^2$/g.

In one or more embodiments, it is appreciated that oxygen molecules as described herein may include oxygen species other than oxygen, such as diatomic oxygen, ozone, and free radical oxygen species.

In certain instances, the OSM in the excess capacity has a gravimetric capacity for oxygen of greater than 10 grams per 100 grams of the OSM, or of between 20 to 80 grams per 100 grams of the OSM, or 25 to 50 grams oxygen per 100 grams of the OSM.

In certain other instances, the OSM has a material (single crystal) density greater than 0.1 g/mL, or of from 0.25 g/mL to 5 g/mL, or of from 0.5 g/mL to 2 g/mL.

In certain other instances, the OSM has a volumetric capacity for oxygen of greater than 2 g/L, or of from 16 g/L to 500 g/L, of or 32 g/L of to 300 g/L, or of from 50 g/L to 220 g/L.

In one or more embodiments to achieve one or more of the properties discussed above, the OSMs are porous, high surface area sorbent materials. Non-limiting examples of the OSMs include crystalline framework-like compounds such as metal-organic frameworks (MOFs), covalent organic frameworks (COFs), zeolitic imidazolate frameworks (ZIFs) and zeolitic materials; aerogel-like substances with nanometer or micrometer scale porosity, such as zero-gels and xerogels; porous carbon materials such as porous carbon gels, porous carbon nanotubes, and porous carbon gels; and porous metal substances such as porous metal oxides, porous metal carbides, porous metal nitride or other porous metal substances with internal sites that favorably form weak physical adsorption sites with oxygen.

Non-limiting examples of the MOFs include: a catalytically-active MOF-5 having embedded metal, such as Ag@[$Zn_4O(BDC)_3$], Pt@[$Zn_4O(BDC)_3$], Cu@[$Zn_4O(BDC)_3$], and Pd@[$Zn_4O(BDC)_3$]; an organically solvated MOF, such as Ti(O$^i$Pr)$_4$[$Cd_3Cl_6$(LI)$_3$].4DMF.6MeOH.3$H_2O$, Ti(O$^i$Pr)$_4$[$Cd_3(NO_3)_6$(LI)$_4$].7MeOH.5$H_2O$, Ti(O$^i$Pr)$_4$[Cd(LI)$_2$($H_2O$)$_2$][$ClO_4$]$_2$.DMF.4MeOH.3$H_2O$, [$Rh_2(M^{2+}TCPP)_2$], where $M^{2+}$ may include Cu, Ni, or Pd, and [$Zn_2(BPDC)_2$(L2)].10DMF.8$H_2O$; an ionically or partially ionically solvated MOF, such as [Ni(L-aspartate)bpy$_{0.5}$] HCl$_{0.9}$MeOH$_{0.5}$, [Cu(L-aspartate)bpy$_{0.5}$] HCl, [Cu(D-aspartate)bpy$_{0.5}$] HCl, [Cu(L-aspartate)bpy$_{0.5}$] HCl, [Cu(D-aspartate)bpy$_{0.5}$] HCl, $Cr_3$(F,OH) (en)$_2$O(BDC)$_3$(ED-MIL-101). $Cr_3$(F,OH)(en)$_2$O(BDC)$_3$(ED-MIL-101), [$Zn_3O$(L3-H)].($H_3O$)$_2$($H_2O$)$_{12}$(D-POST-1), [Sm(L4-$H_2$)(L4-$H_3$)($H_2O$)$_4$].($H_2O$)$_x$, [Cu(bpy)($H_2O$)$_2$($BF_4$)(bpy)], [$Zn_4O(BDC)_3$](MOF-5), [Ln(OH)$H_2O$)(naphthalenedisulfonate)] where Ln includes a lanthanide metal such as Nd, Pr, or La; as well as [$In_4$(OH)$_6$(BDC)$_3$], [$Cu_3$(BTC)$_2$]. [$Sc_2$(BDC)$_3$], [$Sc_2$(BDC)$_{2.5}$(OH)], [$Y_2$(BDC)$_3$($H_2O$)$_2$].$H_2O$, [$La_2$(BDC)$_3$($H_2O$)$_2$].$H_2O$, [Pd(2-pymo)$_2$], $Rh_2$(H2TCPP)$_2$)BF$_4$, [$Cu_2$(trans-1,4 cyclohexanedicarboxylate)$_2$]$H_2O$, [Cu (2-pymo)$_2$], [Co(PhIM)$_2$], [$In_2$(BDC)$_3$(bpy)$_2$], [$In_2$(BDC)$_2$(OH)$_2$(phen)$_2$], [In(BTC)($H_2O$)(bpy)], [In(BTC)($H_2O$)(phen)], [$Sc_2$(BDC)$_{2.5}$(OH)], [$Y_2$(BDC)$_3$($H_2O$)$_2$].$H_2O$, [$La_2$(BDC)$_3$($H_2O$)$_2$]$H_2O$, [$Cu_3$(BTC)$_2$], [Cd(4,4'-bpy)$_2$($H_2O$)$_2$]—($NO_3$)$_2$.($H_2O$)$_4$, [Sm(L4-$H_2$)(L4-$H_3$)($H_2O$)$_4$].($H_2O$)$_x$, $Mn_3$[($Mn_4$Cl)(BTT)$_8$(MeOH)$_{10}$]$_2$, [$Zn_4O(BDC)_3$](MOF-5), Ti-(2,7-dihydroxynaphthalene)-MOF, [Pd(2-pymo)$_2$], [$Cu_3$(BTC)$_2$], [$Cu_3$(BTC)$_2$], [$Cu_3$(BTC)$_2$], [$Rh_2$(L5)], [Rh(BDC)], [Rh (fumarate)], [Ru(1,4-diisocyanobenzene)$_2$]Cl$_2$, [$In_4$(OH)$_6$(BDC)$_3$], [$Ru_2$(BDC)$_2$], [$Ru_2$(BPDC)$_2$], [$Ru_2$(BDC)$_2$(dabco)], [$Ru_2$(BPDC)$_2$(dabco)], [$Rh_2$(fumarate)$_2$], [$Rh_2$(BDC)$_2$], [$Rh_2$($H_2$TCPP)$_2$], and [Pd(2-pymo)$_2$].

In one or more embodiments, the MOF is a porous coordination network (PCN) having at least one entactic metal center (EMC), such as PCN-9 MOF. The EMC is an unusual geometry imposed by a ligand on a metal center in the MOF for the purpose of enhancing the MOF's affinity for oxygen. Non-limiting examples of imposed geometry include adapting organic positive electrode units to generate a pore comparable to the size of the oxygen molecule and introducing a coordinatively unsaturated metal center, such as a metal cation cluster. A combination of several EMCs may create a secondary building unit (SBU) within the MOF suitable for exceptional gas sorption affinity as determined by adsorption isotherms collected at various temperatures and fitted using the Langmuir-Fruendlich equation.

When applied as an example of the OSM, and in certain instances, PCN-9 may be provided with an oxygen adsorption enthalpy greater than 12 kJ/mol.$O_2$, ranging from 15 kJ/mol.$O_2$ to 45 kJ/mol.$O_2$, from 17 kJ/mol.$O_2$ to 43 kJ/mol.$O_2$, or 18 kJ/mol.$O_2$ to 23 kJ/mol.$O_2$. PCN-9 has a fixed pore diameter ranging from 0.55 nm to 0.75 nm or 0.6 nm to 0.7 nm.

In certain instances, the MOF includes a solvated MOF formed from 1,4-benzenedicarboxylic acid (BDC) with a zinc metal cation cluster. A non-limiting example of the solvated MOF is $Zn_4$ (μ-4O) (μ-BDC)$_3$.(DEF)$_7$, where DEF is diethylformamide, a solvent molecule.

An example of a manufacturing process for certain MOFs, such as the MOF-5, includes the steps of mixing a solution of terephthalic acid with a zinc salt, such as zinc nitrate to form a mixture. The mixture is crystallized or precipitated at a temperature ranging from 25° C. to 200° C. The precipitate is filtered from the solution and dried. It is appreciated that MOFs may be modified after synthesis via reactions such as oxidation, acetylization, hydrogenation, Knoevenagel condensation, and/or Heck coupling. Moreover, the MOFs may be activated by removing the solvent introduced during a crystallization and/or precipitation process.

In one or more embodiments, the second electrode 104b, which functions as an anode during discharging, includes a metal material (M). The metal material M may include a metal, such as an alkali metal, an alkaline-earth metal, or a transition metal. The metal material M may also include alloys of such metals, metal ceramics, superalloys, fusible alloys, metal intercalation compounds or materials, and amalgams. In certain particular instances, the metal material M includes an elemental monolith negative electrode, including, for example, Li or Na; a mixed material negative electrode, having an intercalation compound, such as graphite; and/or an alloy, such as a lithium-silicon alloy, a lithium aluminum alloy, and/or a lithium boron alloy.

In certain particular instances, the second electrode 104b is formed of elemental lithium metal. In certain other particular instances, the second electrode 104b includes an alloy of lithium.

The following applications disclose and claim battery systems that may be related to the battery system disclosed and claimed herein: U.S. patent application Ser. Nos. 12/828,380, 12/828,399, 12/828,386, 12/828,752, and 12/828,392, all filed on Jul. 1, 2010. Each of the identified applications is incorporated herein by reference in their entirety.

While the best mode for carrying out the invention has been described in detail, those familiar with the art to which this invention relates will recognize various alternative designs and embodiments for practicing the invention as defined by the following claims.

What is claimed:

1. A metal oxygen battery comprising:
   a cathode;
   an anode including a metal material (M); and
   an oxygen storage material (OSM) formed of pluralities of OSM particles and selective transport layers, each particle completely enclosed by a corresponding selective transport layer, the OSM particles and the selective transport layers are situated within the cathode.

2. The metal oxygen battery of claim 1, wherein the plurality of selective transport layers are oxygen permeable.

3. The metal oxygen battery of claim 1, wherein the plurality of selective transport layers are electrolyte impermeable.

4. The metal oxygen battery of claim 1, wherein a total volume of the plurality of selective transport layers is no greater than 10 percent by volume relative to a total volume of the plurality of OSM particles.

5. The metal oxygen battery of claim 1, wherein a total weight of the plurality of selective transport layers is no greater than 10 percent by weight relative to a total weight of the plurality of OSM particles.

6. The metal oxygen battery of claim 1, wherein the plurality of selective transport layers are oxygen permeable and electrolyte impermeable.

7. The metal oxygen battery of claim 1, wherein each of the plurality of OSM particles has an average particle size of 1 to 500 micrometers.

8. The metal oxygen battery of claim 1, further comprising a non-aqueous liquid electrolyte.

9. The metal oxygen battery of claim 1, further comprising a polymer gel electrolyte, an ionic liquid electrolyte, a solid inorganic electrolyte, a solid polymer electrolyte, or a combination thereof.

10. The metal oxygen battery of claim 1, further comprising at least one of a catalytic component and an ionic component.

11. A metal oxygen battery comprising:
    a cathode;
    an anode including a metal material (M); and
    an oxygen storage material (OSM) formed of pluralities of spherical-shaped OSM particles and selective transport layers, each particle separated from the cathode by a corresponding selective transport layer, the OSM and selective transport layers are situated within the cathode.

12. A method of operating a metal oxygen battery including a cathode, an anode, an oxygen storage material (OSM) formed of pluralities of OSM particles and selective transport layers, each particle completely enclosed by a corresponding selective transport layer, the OSM and the selective transport layers are situated in the cathode, the method comprising:
    communicating oxygen between the cathode and the OSM particles through the selective transport layer.

13. The metal oxygen battery of claim 1, wherein the plurality of selective transport layers are situated within the first electrode.

14. The metal oxygen battery of claim 11, wherein the plurality of selective transport layers are situated within the first electrode.

15. The metal oxygen battery of claim 1, wherein the cathode is a cathode layer.

16. The metal oxygen battery of claim 11, wherein the cathode is a cathode layer.

17. The metal oxygen battery of claim 11, wherein each selective transport layer is bounded between its respective OSM particle and the cathode.

18. The metal oxygen battery of claim 1, further comprising a battery housing closing the anode and the cathode, including the OSM particles enclosed by the corresponding selective transport layers, from atmospheric air.

19. The metal oxygen battery of claim 1, wherein each pair of OSM particle and selective transport layer are arranged as a core and shell, respectively.

20. The metal oxygen battery of claim 1, wherein each OSM particle is spherical-shaped.

21. The metal oxygen battery of claim 1, wherein each selective transport layer is spherical-shaped.

22. The metal oxygen battery of claim 11, wherein each pair of OSM particle and selective transport layer are arranged as a core and shell, respectively.

* * * * *